Feb. 20, 1951         M. K. TAYLOR ET AL         2,542,372
MEASUREMENT OF PHYSICAL STATES OF MATERIALS
Filed Aug. 29, 1945                       3 Sheets-Sheet 1

INVENTORS
M. K. Taylor and
L. C. Nield
BY
Young, Emery & Thompson
ATTORNEYS

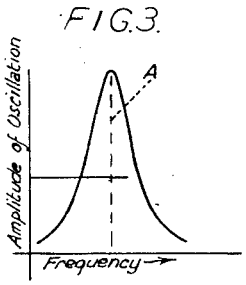
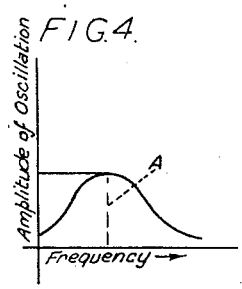
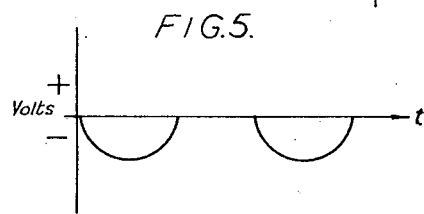
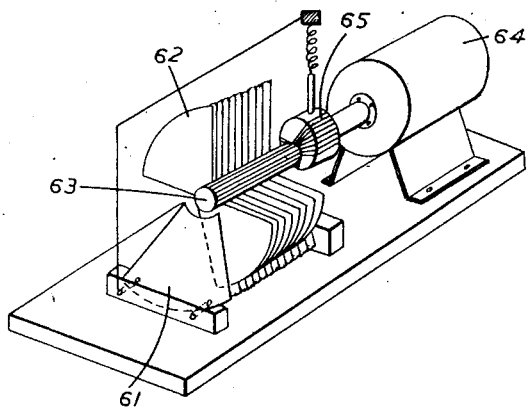

Patented Feb. 20, 1951

2,542,372

UNITED STATES PATENT OFFICE 2,542,372

MEASUREMENT OF PHYSICAL STATES OF MATERIALS

Maurice Kenyon Taylor, Hale, and Leslie Camden Nield, Glossop, England; said Taylor assignor to Ferranti Limited, Hollinwood, England, a British company, and said Nield assignor to Tootal Broadhurst Lee Company, Limited, Manchester, England, a British company Application August 29, 1945, Serial No. 613,372 In Great Britain September 19, 1944

1 Claim. (Cl. 175—183)

It has heretofore been proposed to provide apparatus for measuring or controlling a physical state such as wetness of a material by utilising the effect of variation of the physical state on a condenser of which the material forms all or part of the dielectric. For example in the specification of British Patent No. 275,741 apparatus is described in which such a condenser is included in a high frequency oscillating circuit and measurement or control is effected in accordance with frequency changes in the circuit or capacity of the condenser. Similarly in the specification of British Patents Nos. 396,093, 337,745, and 558,491, various forms of apparatus are described in which variation of frequencies or capacity is measured.

We have, however, now ascertained that if an oscillator circuit contains a condenser of which the material forms all or part of the dielectric, and such circuit is tuned to its resonant frequency, its resistance undergoes considerably greater variation for a given change of wetness or similar physical state of the material than does the capacitance of the condenser, and accordingly greater sensitivity is achieved if measurement is based on such resistance factor. The change in physical state is accompanied by a change in dielectric loss; for example when the material becomes moist the energy losses in the dielectric increase with increasing moisture content. By measuring such dielectric losses an indication of the moisture content of the material may be obtained and we have found that this can be effected with sensitive detection of small changes by measurements based on the amplitude of oscillation in a circuit tuned to resonant frequency (when amplification is a maximum) which amplitude is mainly dependent on the circuit resistance of the tuned circuit, as against measurement of change of frequency or capacity which is substantially independent of circuit resistance.

Furthermore, in order to avoid ambiguity in the observed readings, each reading is taken when the amplification provided by the amplifier is a maximum, that is to say, when the tuned circuit is resonant. For example, if the amplification for one value of the moisture content is not a maximum, the reading obtained would correspond with the reading obtained for a smaller value of the moisture content with the tuned circuit resonant. Thus, it is essential that the frequency generated by the oscillator corresponds with the resonant frequency of the tuned circuit when each measurement of the moisture content is made. Consequently, it is necessary to adjust the tunable oscillator when each reading is made so as to ensure that the tuned circuit is resonant. This proves to be of no difficulty when the moisture content has appreciably constant values over large areas of the web. However, if the moisture content is approximately constant only over small areas disposed along the length of the web, it becomes necessary to perform numerous manual adjustments of the tunable oscillator, and the main object of this invention is to avoid this difficulty.

According to the present invention, the apparatus for measuring a physical state of a material comprises a condenser between the plates of which said material is disposed which condenser is incorporated in the tuned circuit of an amplifier, a tunable oscillator circuit for providing an input to said amplifier, automatic means in one of said circuits adapted to vary the tuning thereof cyclically and repeatedly through a frequency band including the resonant frequencies resulting from all likely changes in said physical state, and means for deriving the value of the resonant amplitude of oscillation in the tuned circuit at different degrees of amplitude occasioned by different dielectric losses due to differences in said physical state.

The invention is particularly suited to the production of material having at least one physical state, such as moisture content, substantially constant and accordingly the present invention also includes a method which comprises continuously moving the material through the plates of a condenser in a tuned circuit, feeding current to said circuit from a tunable oscillatory circuit, automatically varying the tuning of said tunable oscillatory circuit cyclically and repeatedly at predetermined intervals of time through the whole of a frequency band including the resonant frequencies of the tuned circuit resulting from all likely changes in said physical state, deriving values of the resonant amplitude of oscillation; and varying the treatment of said material in accordance with said values.

The altered value can be indicated on a meter or can be utilized to actuate control means for correcting the physical state of the material.

The required value may be derived by measuring the amplification factor of a valve having the tuned circuit as its anode load, and the impedance of the valve is preferably arranged to be high in comparison with the impedance of the tuned circuit in order to detect small changes of amplification.

In carrying out the invention a tuning condenser of the oscillator circuit may be driven by a small motor. Thus, once in every cycle the two circuits will be in tune; the actual frequency at which they are in tune will vary according to the variation in the resonant frequency of the tuned circuit which is dependent on the moisture content or other similar physical state of the material. A short pulse of oscillations is derived each time the circuits pass through the in-tune frequency, the envelope of the amplitude being that of the resonance curve of the tuned circuit. This amplitude will vary according to the said physical state of the material and can be measured by suitable means.

In order that the above and other features of the invention may be clearly understood, it will now be described by way of example with reference to the accompanying diagrammatic drawings wherein:

Figures 3, 4 and 5 show frequency and voltage curves to be referred to; and

Figure 7 illustrates a device for use with the apparatus shown in Figure 2.

Figure 1:
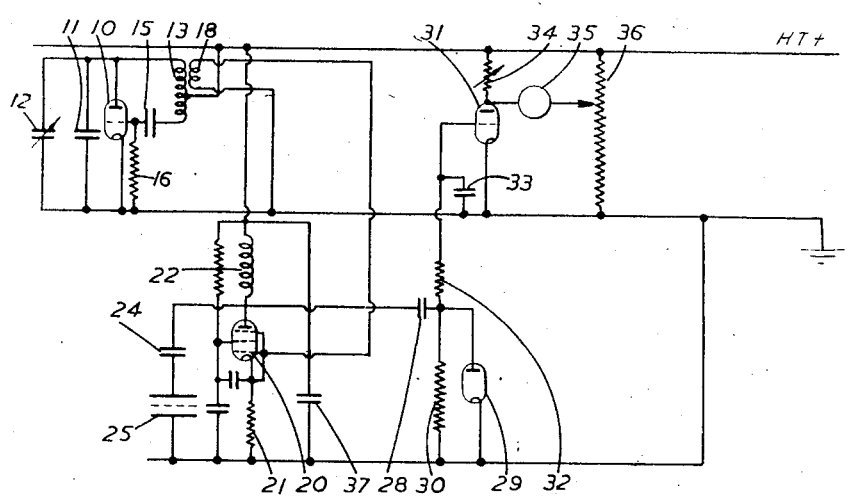
Figure 1 is an electrical circuit diagram of an apparatus made in accordance with the invention.

In the apparatus shown in Figure 1, an oscillator is provided comprising a thermionic valve 10, fixed condenser 11, automatically tunable condenser 12, and a tuning coil 13 connected through a condenser 15 to the valve grid and connected through a resistance 16 to earth. Owing to the presence of the decoupling condenser 37 the lower ends of condensers 11 and 12 are, as regards high frequencies, connected to the HT tapping point of coil 13, these condensers being, in effect, connected between the anode end and the HT tapping point of this coil. The oscillator is therefore of the kind in which the tuned circuit is between anode and cathode, the feedback to the grid being by way of the lower part of coil 13, i. e., between the HT tapping point and the grid end of the coil. The tuning coil 13 is formed by the primary winding of a transformer, the secondary winding 18 of which is connected between the control grid of a pentode amplifier valve 20 and earth. The cathode of this pentode valve is connected to the earthed negative pole of a high-tension supply by way of a biasing resistance 21 and the screen grid and the suppressor grid are connected in the usual manner. The anode of the pentode amplifier valve is connected to the positive pole of the high-tension supply through a load inductance-winding 22 and to earth by way of the series connection of two condensers 24, 25. The condenser 24 is a D. C. blocking condenser and the condenser 25 is specially designed in that it consists of two parallel plate electrodes, spaced so as to allow the passage of a web 26 of the material to be tested between them, the web of material forming the dielectric of this condenser. The anode of the pentode amplifier valve 20 is also connected by way of another condenser 28 to the anode of a diode rectifier valve 29. The anode of this diode valve 29 is connected by way of a diode-load resistance 30 to its cathode which is earthed, and is further connected to the control grid of a triode direct-current amplifier valve 31 by way of a resistance 32. A by-pass condenser 33 is connected between the control grid and earth. The cathode of this valve is earthed and the anode is joined to the positive pole of the high-tension supply by way of an anode-load resistance 34 and also by way of a milliammeter 35 to the sliding contact of a potentiometer 36 connected across the high-tension supply which is decoupled by a condenser 37 in the usual manner. This arrangement forms a resistance bridge.

Decoupling condenser 37 renders the lower end of condenser 25 effectively connected to the upper end of coil 22, thus forming a tunable circuit comprising coil 22 and condensers 24 and 25 connected in series across it.

The connection from the anode of the pentode amplifier valve 20 to earth, by way of the load inductance winding 22 and the high-tension decoupling condenser 37 forms one branch of an A. C. parallel circuit. The connection to earth from the anode of this pentode valve by way of the D. C. blocking condenser 24 and the specially-designed condenser 25 forms the other branch of the A. C. parallel circuit. This parallel circuit, which has a characteristic resonant frequency, is herein referred to as the "tuned circuit."

Continuous unmodulated oscillations generated by the oscillator 10 are amplified by the pentode amplifier valve 20, and the amplified oscillations are rectified by the diode rectifier valve 29. A D. C. potential is developed across the rectifier load resistance 30 and this is applied to the control grid of the triode direct-current amplifier valve 31. The reading of the milliammeter 35 is proportional to the current through this valve.

For the purpose of calibration a sample of the absorbent material of the type to be examined, having a known moisture content, is now placed between the two parallel plates, and the tuning condenser in the oscillator is adjusted until the tuned circuit is resonant. The minimum reading of the milliammeter is noted, or if preferred the reading of the milliammeter may be adjusted to zero by varying the potentiometer 36. Further samples of similar absorbent material, each one having a known moisture content, are disposed in turn between the two plates and each of the minimum milliammeter readings noted.

Thus the milliammeter is calibrated in terms of the moisture content of the absorbent material, and the apparatus may now be employed for the purpose of determining the value of the moisture content of a web of similar absorbent material or for measuring changes in the moisture content of a moving web of the absorbent material, the movement being either continuous or intermittent.

The cloth or other material to be tested is placed between the plates of the condenser 25 and the frequency re-adjusted until the two circuits (comprising the oscillator and the pentode amplifier with the tuned circuit) are in tune thereby giving the minimum reading of the milliammeter for that particular piece of cloth. A measure of the moisture content of the material may now be obtained from the milliammeter calibrated as described above or the milliammeter reading may be reduced to zero by means of the potentiometer and a measure of the moisture content obtained from the calibrated position of the potentiometer slider. The measurement of the amplitude of oscillation or magnification factor ("Q") of the valve 20 depends mainly on the circuit resistance of the tuned circuit. The amplification of the valve 20 is of very high impedance compared to the "on-tune" impedance $$\left(\frac{L}{CR}\right)$$

of the tuned circuit is $$\frac{GL}{CR}$$

where G is the mutual conductance of the valve in amperes per volt. The measurement therefore includes the circuit capacitance C as well as the circuit resistance R but for a given change in moisture content of the material the resistance varies many times the variation of the capacitance and consequently the measurement mainly and essentially varies with circuit resistance which gives a measure of dielectric loss.

An example of an amplitude/frequency curve of the tuned circuit obtainable with dry cloth is shown in Figure 3 in which the broken line A indicates the amplitude at resonant frequency which is measured according to the present invention. The type of variation produced by wet cloth is shown in Figure 4 where A again indicates the amplitude at resonant frequency which is measured according to the present invention.

It is essential to tune the said two circuits before each reading, since variation in moisture content of the material will alter its dielectric constant and hence the capacity and resonant frequency of the tuned circuit. Consequently one reading on the milliammeter could mean either that the cloth is dry, but the H. F. pentode amplifier circuit is off-tune, or that the cloth is wet and the H. F. pentode amplifier circuit is in tune.

This ambiguity is consequently removed by always tuning the circuits before a reading is taken.

To eliminate manual tuning of the circuits the tuning condenser 12 of the oscillator may be driven by a small motor so that a band of frequencies is repeatedly swept by the oscillator, this band including the resonant frequency of the tuned circuit. Thus once in every cycle the two circuits will be in tune. The actual frequency at which they are in tune will vary according to the variation in the resonant frequency of the tuned circuit which in turn varies with the moisture content of the cloth or other material under test. The output from the anode of the H. F. pentode valve will now consist of a short pulse of oscillations each time the generated oscillations sweep through the resonant frequency of the tuned circuit, the envelope of the oscillations being that of the resonance curve of the tuned circuit and corresponding to Figure 3 for dry cloth and to Figure 4 for wet cloth. If the time constant of the diode load is long compared with the band-sweeping time, the diode output will be D. C. and the same D. C. amplifier and milliammeter as in Figure 1 is suitable.

Figure 2:
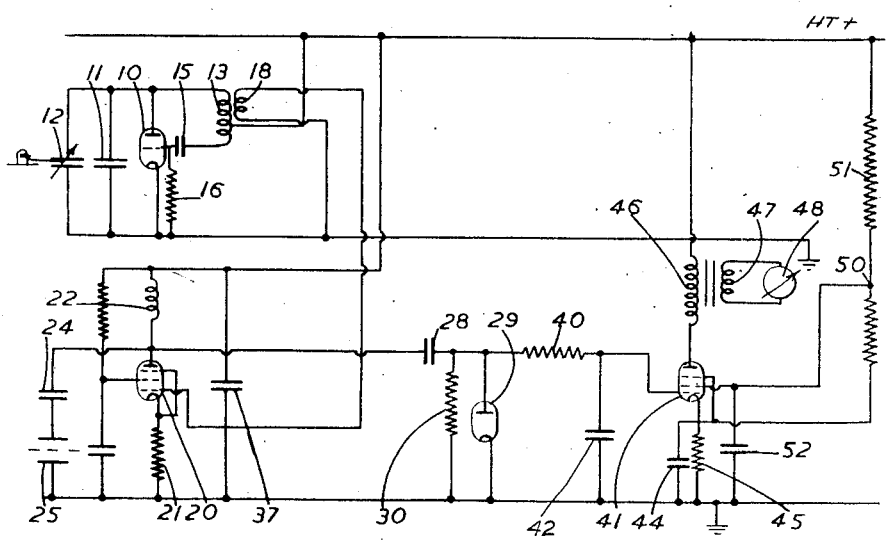
Figure 2 is an electrical circuit diagram of a modified form of apparatus.

The circuit may however be arranged so that the time constant of the diode circuit, although large compared with the oscillation period, is small compared with the time taken for the oscillator to sweep the frequency band. In this case the output from the rectifier will consist of D. C. pulses recurrent at the band sweep frequency, the wave-form of which will be as indicated in Figure 5. With such an arrangement the modified apparatus illustrated in Figure 2 is employed in which the oscillator, tuned circuit, H. F. pentode, and diode are the same as in Figure 1, but the diode anode is connected by way of a resistance 40 to the control grid of a second pentode amplifier valve 41, which grid is returned to earth by way of a condenser 42. This resistance 40 and this condenser 42 form a low-pass filter circuit. The control-grid is also auto-biased by the parallel combination of a condenser 44 and a resistance 45 in the cathode-earth lead. The anode of the second pentode amplifier valve is connected to the positive terminal of the high-tension supply through the primary winding 46 of a load transformer, the secondary winding 47 of which is connected to an A. C. measuring instrument 48. The output of this valve is of non-sinusoidal A. C. form. The suppressor grid is connected to the cathode and the screen grid is jointed to the sliding contact 50 of a potentiometer 51 connected between the positive terminal of the high-tension supply and the cathode, and is also connected by way of a condenser 52 to earth. The high-tension supply is decoupled by a condenser as in Figure 1.

The apparatus may be calibrated and used in substantially the same way as the apparatus illustrated in Figure 1.

The frequency of the oscillations of the oscillator is preferably automatically varied through said selected frequency band repeatedly in the same direction at predetermined intervals of time and for this purpose the device illustrated in Figure 7 may be used. The condenser comprises a series of fixed plates 61 which are quadrantal in shape and a series of moveable plates 62 which are earthed by a slip ring (not shown) and have a similar shape to the fixed plates. The moveable plates are fitted onto a rotatable spindle 63 and are symmetrically arranged so as to form two diametrically opposite sets. Rotation of the spindle is effected by a small motor 64. A rotary switch 65 is fitted onto the rotating spindle and is so constructed that the condenser is connected in the circuit only during periods when the position of either set of plates is such that the frequency of the generated oscillations is decreasing from a maximum value to a minimum value. It will be clearly seen that the condenser is connected in the circuit twice in every complete period of revolution of the spindle. When one set of moving plates enters between the fixed plates the tuning condenser is switched in and oscillations are generated which persist for one-quarter of a cycle of the period of revolution of the spindle and the frequency of such oscillations continuously decreases from a maximum value to a minimum value. The oscillator is then switched off by the rotary switch for the next quarter-cycle until the first set of moving plates leaves the space between the fixed plates and the second set of moving plates enters between them. Oscillations are again generated in like manner. At the end of this third quarter-cycle, the oscillator is again switched off for a quarter-cycle until the first set of moving plates enters between the fixed plates. The cycle is then repeated.

Thus the output from the oscillator consists of a period during which oscillations are generated, the frequency of which continuously decreases sinusoidally from a mixmum value to a minimum value during the generation period, followed by a period of non-operation of the oscillator, this latter period being equal in time duration to the former period. The frequency band is chosen so that it includes all values of the resonant frequency of the tuned circuit which are likely to be encountered during the course of measuring the moisture content of an absorbent material.

The amplifier output is rectified by the diode valve, thereby providing pulses of direct current which recur at time intervals equal to one-half period of revolution of the spindle, since the time constant of the diode circuit is small with respect to this half-period. The rectified output passes through the low-pass filter circuit and is applied to the control grid of the second amplifier valve, and is finally measured by the instrument 48.

For continuous working processes when it is desired to observe and to measure changes in moisture content, a web of the absorbent material in which it is desired to have a constant moisture content is arranged to pass in turn through a wetting bath, a drying oven and between the two parallel plates. The reading of the A. C. instrument is noted and if this is lower than the reading for the desired constant value the material is too dry and either the speed with which the web moves is increased or the rate of heating is decreased; if the reading is higher than the reading for the desired constant value, the material is too wet and either the speed is decreased or the rate of heating is increased.

Any changes in the moisture content of the web from the desired constant value as it passes between the two parallel plates are indicated by a movement of the pointer of the A. C. measuring instrument from the desired reading and such changes are, if required, measured.

Any known form of oscillator may be employed in the apparatus instead of the oscillator described in the above embodiments. Further, any resonance-indicating means other than those comprising a diode valve rectifier, a D. C. or an A. C. amplifier valve as the case may be and a measuring instrument, as described in the above embodiments, may be employed.

If, in any calibration, it is desired to reduce the smallest of the readings obtained in the calibration to zero, the position of the sliding contact of the potentiometer is varied until the pointer indicates zero.

It will be apparent that the invention may be applied to the measurement of moisture of an absorbent material or to the measurement of changes in the moisture content of a moving web of absorbent material.

In a modification of the invention as applied to a moving web, given by way of example, a servo-mechanism actuated by changes in an electrical characteristic dependent upon the dielectric losses consequent upon a change in the moisture content of a moving web of absorbent material, is provided so as to restore the moisture content of the web when a change in the moisture content occurs. Actuation of the servo-mechanism by a change in the value of the electrical characteristic brings about a change in one of the conditions determining the moisture content. For example, the rate of heating may be changed, or, alternatively, the change may be made in the speed with which the web moves.

Figure 6:
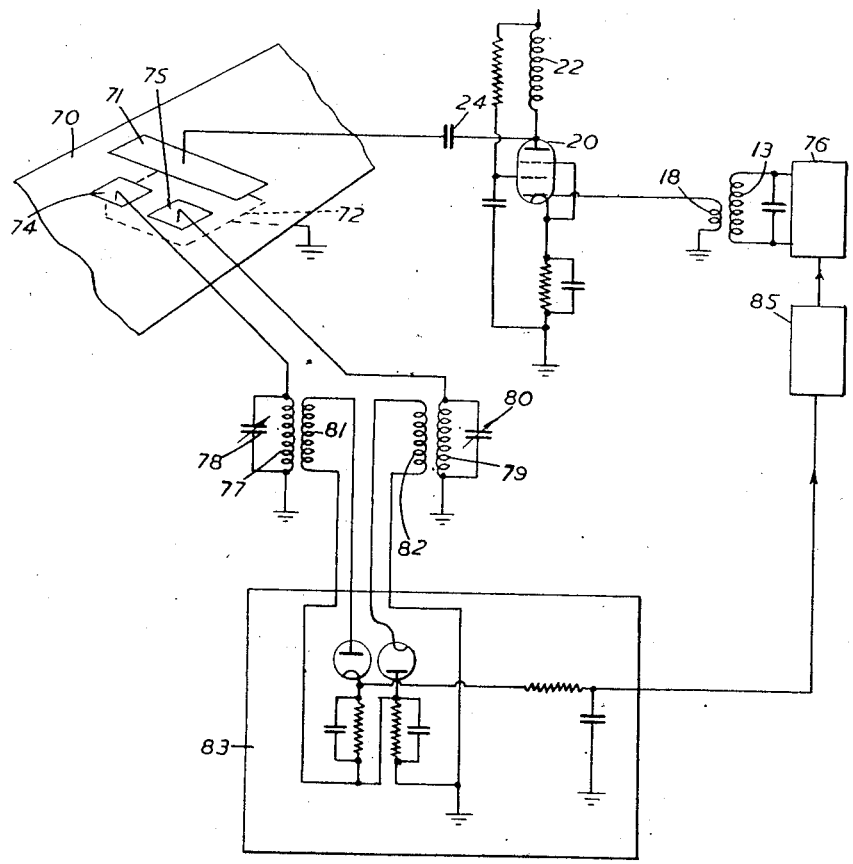
Figure 6 shows means for automatically maintaining the tuned circuit in a condition of resonance.

In a modification of the invention means for automatically maintaining the tuned circuit in a condition of resonance are provided. According to one form, illustrated in Figure 6, the web 70 of the material to be tested passes between upper and lower plates 71, 72, respectively, of a main testing condenser located at a suitable position and between two additional upper plates 74, 75 (located at a closely adjacent position) and an extension of the lower plate 72. The lower plate is earthed and the upper plate 71 is connected through a condenser 24 to the anode lead of a pentode valve 20.

The upper plate 74 together with the adjacent area of lower plate 72 forms the main capacitive component of a control oscillatory circuit of which the inductive component is a coil 77, which has a trimmer condenser 78 connected across it. The upper plate 75 and adjacent area of lower plate 72 similarly forms the main capacitive component of another control oscillatory circuit including a coil 79 and trimming condenser 80. These two control circuits are coupled by coils 81 and 82 respectively to a discriminator circuit of known type indicated generally at 83. This circuit is connected to a reactance valve circuit indicated generally at 85, which is in turn connected to the main oscillator 76. The latter is so adjusted that in the absence of a control voltage from the discriminator it will cause the main oscillatory circuit comprising condenser 71, 72 and inductance 22 to oscillate at its resonant frequency when the material has the desired degree of wetness. The resonant frequencies of oscillatory circuits 74, 77 and 75, 79 are respectively dependent on the tuning of trimmer condensers 78 and 80 and on the dielectric constant of the material between the plates of condensers 74, 72 and 75, 72. Trimmer condensers 78 and 80 are so adjusted that when the material has the desired degree of wetness its dielectric constant is such as to cause one of these control oscillatory circuits to have a resonant frequency a certain amount below, and the other to have a resonant frequency an equal amount above, the resonant frequency of the main oscillatory circuit.

In operation, sufficient fringing exists between upper plate 71 and upper plates 74 and 75 to enable the main oscillatory circuit to drive the two control oscillatory circuits, the frequency in all three circuits being that determined by oscillator 76. Under the desired degree of wetness, this frequency is mid-way between the resonant frequencies of the two control circuits and no control potential is developed. Suppose now that the wetness of the material and hence its dielectric constant changes from the desired value. The resonant frequencies of the two control circuits both change, owing to the altered capacity of condensers 74, 72 and 75, 72, both becoming displaced up or down the frequency scale whilst maintaining approximately the same extent of separation. The result of this displacement is that the frequency injected into these circuits from the main circuit no longer lies midway between their resonant frequencies; a control potential therefore becomes developed in known discriminator manner, as a result of which the reaction valve 85 so alters the tuning of oscillator 76 as to tend to adjust its frequency to the new resonant frequency of the main oscillatory circuit (caused by the altered capacity of condenser 71, 72), i. e. as to tend to displace the oscillator frequency up or down the frequency scale towards the new mean position between the resonant frequencies of the control circuits.

It will be seen from the above that the frequency-control system described is different in one important respect from normal automatic frequency control systems, which in other respects it resembles. In the present system, the desired frequency, and hence the resonant frequencies of the two control oscillatory circuits, is variable, depending on the wetness of the material; whereas in the normal systems, the desired frequency, and hence the tuning of the control circuits, is fixed.

Although change of dielectric loss generally results in change of frequency in the tuned circuit this may not always be so as it is possible for variations in the material to be of such a nature as to vary the dielectric loss without varying the frequency of the tuned circuit.

It will be appreciated that passage of a normal piece or web of material through the condenser will be equivalent to passing a "standard" piece through the condenser with occasional interposition of pieces of the web of abnormal quality to be detected.

Having now particularly described and ascertained the nature of our said invention and in what manner the same is to be performed, we declare that what we claim is:

An apparatus for measuring a physical state of a material comprising an amplifier having a pentode valve, an input coil, and a tuned circuit, said tuned circuit forming part of the output circuit of said amplifier and having an inductance, a condenser of fixed capacity, and a condenser having plates between which said material is disposed, a tunable oscillator circuit for providing an input to said amplifier said tunable oscillator circuit having an output coil mutually coupled to said input coil, automatic means in one of said circuits adapted to vary the tuning thereof cyclically and repeatedly through a frequency band including the resonant frequencies resulting from all likely changes in said physical state, a diode rectifier circuit for rectifying the pentode anode output, the time constant of this circuit being small compared with the period of variation of frequencies, a low-pass filter circuit associated with the output of the rectifier circuit, a second amplifier circuit associated with the output of the rectifier circuit and a transformer comprising the anode lead of the said second amplifier circuit for providing an A. C. output having the frequency of the repeating periods of variation of the frequencies and the amplitude of which is proportional to the magnification of the said tuned circuit.

MAURICE KENYON TAYLOR.
LESLIE CAMDEN NIELD.

REFERENCES CITED

The following references are of record in the file of this patent:

UNITED STATES PATENTS

| Number | Name | Date |
|---|---|---|
| 1,722,655 | Bone | July 30, 1929 |
| 1,822,604 | Simons et al. | Sept. 8, 1931 |
| 2,162,827 | Schrader | June 20, 1939 |
| 2,244,722 | Norcross | June 10, 1941 |
| 2,270,732 | Jones | Jan. 20, 1942 |
| 2,285,152 | Firestone | June 2, 1942 |
| 2,303,081 | Krogh | Nov. 24, 1942 |
| 2,356,510 | Deserno | Aug. 22, 1944 |
| 2,373,846 | Olken | Apr. 17, 1945 |
| 2,399,582 | Stevens | Apr. 30, 1946 |
| 2,415,799 | Reifel | Feb. 11, 1947 |

FOREIGN PATENTS

| Number | Country | Date |
|---|---|---|
| 507,231 | Great Britain | Sept. 8, 1937 |